(12) United States Patent
Eichenberger et al.

(10) Patent No.: US 8,819,651 B2
(45) Date of Patent: Aug. 26, 2014

(54) EFFICIENT SOFTWARE CACHE ACCESSING WITH HANDLE REUSE

(75) Inventors: Alexandre E. Eichenberger, Chappaqua, NY (US); Marc Gonzalez Tallada, Yorktown Heights, NY (US); John K. O'Brien, South Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 1799 days.

(21) Appl. No.: 12/177,543

(22) Filed: Jul. 22, 2008

(65) Prior Publication Data

US 2010/0023932 A1 Jan. 28, 2010

(51) Int. Cl.
*G06F 9/45* (2006.01)

(52) U.S. Cl.
USPC .......................................... 717/151; 717/160

(58) Field of Classification Search
CPC ..................................................... G06F 8/4442
USPC ........................................................ 717/151
See application file for complete search history.

(56) References Cited

U.S. PATENT DOCUMENTS

| | | | | |
|---|---|---|---|---|
| 5,261,066 | A * | 11/1993 | Jouppi et al. | 711/122 |
| 6,427,191 | B1 * | 7/2002 | Fu et al. | 711/131 |
| 7,086,038 | B2 * | 8/2006 | Cronquist et al. | 717/136 |
| 7,162,401 | B1 * | 1/2007 | Abeles | 703/13 |
| 7,243,195 | B2 | 7/2007 | O'Brien et al. | |
| 2003/0005419 | A1 * | 1/2003 | Pieper et al. | 717/141 |
| 2003/0033480 | A1 * | 2/2003 | Jeremiassen | 711/118 |
| 2005/0268038 | A1 * | 12/2005 | Yasue | 711/118 |
| 2005/0268039 | A1 * | 12/2005 | Archambault et al. | 711/119 |
| 2007/0088919 | A1 | 4/2007 | Shen et al. | |
| 2007/0162701 | A1 | 7/2007 | Schlansker et al. | |
| 2007/0261042 | A1 * | 11/2007 | Chen et al. | 717/148 |
| 2007/0271565 | A1 | 11/2007 | Tirumalai et al. | |
| 2008/0046657 | A1 | 2/2008 | Eichenberger et al. | |
| 2008/0065809 | A1 | 3/2008 | Eichenberger | |
| 2010/0057792 | A1 * | 3/2010 | Ylonen | 707/206 |

OTHER PUBLICATIONS

Darnell et al., "Automatic Software Cache Coherence through Vectodzation", Proceedings of the ACM 1992 International Conference onSut}ercomDutinQ. Washinqton, DC, Jul. 1992, pp. 1-15.*

Lu et al., "The Performance of Runtime Data Cache Prefetching in a Dynamic uptimlzatJon System", IEEE, Proceedings of the 36th International Symposium on Microarchitecture (MICRO-36'03), 11 pages.*

(Continued)

*Primary Examiner* — Wei Zhen
*Assistant Examiner* — Mohammed Huda
(74) *Attorney, Agent, or Firm* — Stephen J. Walder, Jr.; Thomas E. Tyson

(57) ABSTRACT

A mechanism for efficient software cache accessing with handle reuse is provided. The mechanism groups references in source code into a reference stream with the reference stream having a size equal to or less than a size of a software cache line. The source code is transformed into optimized code by modifying the source code to include code for performing at most two cache lookup operations for the reference stream to obtain two cache line handles. Moreover, the transformation involves inserting code to resolve references in the reference stream based on the two cache line handles. The optimized code may be output for generation of executable code.

22 Claims, 6 Drawing Sheets

(56) References Cited

OTHER PUBLICATIONS

Darnell et al., "Automatic Software Cache Coherence through Vectorization", Proceedings of the ACM 1992 International Conference on Supercomputing, Washington, DC, Jul. 1992, pp. 1-15.

Lu et al., "The Performance of Runtime Data Cache Prefetching in a Dynamic Optimization System", IEEE, Proceedings of the 36th International Symposium on Microarchitecture (MICRO-36'03), 11 pages.

* cited by examiner

```
= a[i] + a[i+4] + a[i+8] + a[i+16]
```

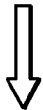

```
if (miss(&a[i+0])) missHandler(&a[i+0]); c0=lineInCache(&a[i+0]);
if (miss(&a[i+4])) missHandler(&a[i+4]); c4=lineInCache(&a[i+4]);
if (miss(&a[i+8])) missHandler(&a[i+8]); c8=lineInCache(&a[i+8]);
if (miss(&a[i+16])) missHandler(&a[i+16]); c16=lineInCache(&a[i+16]);

= load(c0+offset(&a[i+0])) +
  load(c4+offset(&a[i+4])) +
  load(c8+offset(&a[i+8])) +
  load(c16+offset(&a[i+16]))
```

```
if (miss(&a[i+0])) missHandler(&a[i+0]); cB=lineInCache(&a[i+0]);
if (miss(&a[i+16])) missHandler(&a[i+16]); cT=lineInCache(&a[i+16]);
x = (128 -&a[i]%128)/4  // need AND, subtract, and shift or 6 cycles on SPE = load(cB+offset(&a[i+0])) +
  load((4 < x ? cB : cT)+offset(&a[i+4])) +
  load((8 < x ? cB : cT)+offset(&a[i+8])) +
  load(cT+offset(&a[i+16]))
```

*FIG. 4B*

```
for(i=0; i<1K; i++) {
    ... &a[i] ...
}
```

⇩

```
for(i=0; i<1K; i++) {
    if (miss(&a[i]) missHandler(&a[i]); c=lineInCache(&a[i]);
    ... load(c + offset(&a[i]) ...
}
```

FIG. 5A

```
520 ─ for(ii=0; ii<1K; ii+=32) {
    510 ─ for(i=0; i<32; i++) {
            if (miss(&a[ii+i]) missHandler(&a[ii+i]);
            c=lineInCache(&a[ii+i]);
            ... load(c + offset(&a[ii+i]))
        }
    }
```

FIG. 5B

```
520 ─ for(ii=0; ii<1K; ii+=32) {
        if (miss(&a[ii]) missHandler(&a[ii]); cB=lineInCache(&a[ii]);
        if (miss(&a[ii+32]) missHandler(&a[ii+32]); cN=lineInCache(&a[ii+32]);
        x = (128 - &a[ii]%128)/4;
    510 ─ for(i=0; i<32; i++) {
            ... load((i < x ? cB : cN) + offset(&a[ii+i]))
        }
    }
```

FIG. 5C

```
        if (miss(&a[0]) missHandler(&a[0]); cB=lineInCache(&a[0]);
520 ⎯   for(ii=0; ii<1K; ii+=32) {
            if (miss(&a[ii+32]) missHandler(&a[ii+32]);
            cN=lineInCache(&a[ii+32]);
            x = (128 - &a[ii]%128)/4;
510 ⎯      for(i=0; i<32; i++) {
                ... load(i < x ? cB : cN, offset(&a[ii+i]))
            }
            cB = cN;
        }
```

EFFICIENT SOFTWARE CACHE ACCESSING WITH HANDLE REUSE

BACKGROUND OF THE INVENTION

1. Field of the Invention

The present application relates generally to an improved data processing apparatus and method and more specifically to an apparatus and method for performing efficient software cache accessing with handle reuse.

2. Background of the Invention

A cache is a mechanism for expediting access to data/instructions that a processor would otherwise need to fetch from main memory. The cache serves as a temporary storage area where frequently accessed data/instructions can be stored for rapid access. Once the data/instructions are stored in the cache, future use may be made by accessing the cached copy of the data/instructions rather than re-fetching or re-computing the original data so that the average access time is shorter.

Caches may be managed by hardware or software. Software caches are used, for example, in computer architectures with non-coherent local memories in which frequently accessed global data structures can be temporarily stored. A typical sequence of actions for accessing a software cache, assuming a reference to a variable a[i] mapped in a global address space, comprises attempting to obtain the data from the software cache, determining if a software cache miss occurs, and if a software cache miss occurs, performing miss handling to load a software cache line having the data from main memory into the software cache. This sequence of actions, provided in pseudocode, looks like:

```
getDataFromCache(addr);
    if (miss(addr)) missHandler(addr);
    ptr = lineInCache(addr);
    data = load (ptr + offset(addr)).
```

With this pseudocode, when attempting to get the data pointed to by the global address "addr," the first task is to check if the data pointed to by addr is in the local cache or not. This action typically mimics the actions of a typical hardware cache by first determining the set, e.g., the portion of the software cache, in which the data is expected then comparing the address to the tags associated with that set. If there is a match among the tags, then a cache hit is determined to have occurred. Otherwise, if a match is not found among the tags, a cache miss is determined. The task of the miss handler is to evict one line from the set, possibly writing it back to the global address space, and then loading the cache line associated with the requested address. The local cache line that is associated with the requested data corresponding to addr is determined and identified by a pointer value ptr. This pointer value is used to retrieve the data by accessing the data value indexed by the offset of addr within the cache line pointed to by the pointer ptr. On one known processor architecture, the above actions may take approximately 11 instructions and 27 processor cycles to complete assuming that there is a cache hit, i.e. the miss handler is not invoked.

Now consider the following code sequence involving integer computations:

=a[i]+a[i+4]+a[i+8]+a[i+16]

Using known mechanisms, this code sequence is transformed into the following code sequence by the compiler in which cache lookup code is inserted:

```
if (miss(&a[i+0]))  missHandler(&a[i+0]);  c0=lineInCache(&a[i+0]);
if (miss(&a[i+4]))  missHandler(&a[i+4]);  c4=lineInCache(&a[i+4]);
if (miss(&a[i+8]))  missHandler(&a[i+8]);  c8=lineInCache(&a[i+8]);
if (miss(&a[i+16])) missHandler(&a[i+16]);
c16=lineInCache(&a[i+16]);
= load(c0+offset(&a[i+0])) +
  load(c4+offset(&a[i+4])) +
  load(c8+offset(&a[i+8])) +
  load(c16+offset(&a[i+16]))
```

As shown above, this transformed code uses 4 cache lookup operations with each cache lookup operation taking approximately 27 processor cycles assuming no cache misses. Thus, assuming no cache misses, this code may take 27*4=108 processor cycles to complete. If there is a cache miss, the number of processor cycles may be dramatically increased as the miss handler must evict a cache line and load the required cache line using a main memory access. For example, in one processor architecture, a cache miss may require approximately 35 processor cycles to detect the cache miss and approximately 400 processor cycles to get the required data from main memory. Thus, both cache hits and cache misses represent a large cost in processor cycles.

BRIEF SUMMARY OF THE INVENTION

In one illustrative embodiment, a method, in a data processing system having a software cache, is provided for optimizing memory accesses in source code. The method may comprise grouping references in source code into a reference stream with the reference stream having a size equal to or less than a size of a software cache line. The source code may be transformed into optimized code by modifying the source code to include code for performing at most two cache lookup operations for the reference stream to obtain two cache line handles. Moreover, the transformation may involve inserting code to resolve references in the reference stream based on the two cache line handles. The optimized code may then be output for generation of executable code for execution on one or more processors.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4A illustrates transformed code of an original code statement by a compiler using a traditional approach;

FIG. 4B illustrates transformed code of the same original code statement as shown in FIG. 4A by a compiler using a locality approach in accordance with one illustrative embodiment;

FIG. 5A is an exemplary diagram of loop code illustrating original loop code and the transformed loop code according to a known compiler technique;

FIG. 5B illustrates a strip mined version of the original loop code of FIG. 5A assuming 4 byte accesses and a cache line of 128 bytes;

FIG. 5C is an exemplary diagram illustrating the locality optimization performed by the illustrative embodiments following the strip mining illustrated in FIG. 5B;

DETAILED DESCRIPTION OF THE INVENTION

The illustrative embodiments provide mechanisms for efficiently accessing a software cache by reusing cache handles. The mechanisms of the illustrative embodiment group references that exploit spatial locality within the software cache into streams. Once grouped into streams, a cache lookup for the first and last reference of the stream is performed and the cache handles, i.e. the address of the cache line in the local memory, for the first and last reference are preserved. For other references within the stream, a simple computation is performed to determine which of the cache handles to use with the reference. In this way, cache handles are reused for references within a stream to thereby reduce the number of processor cycles required to perform cache lookup operations.

Figure 1:
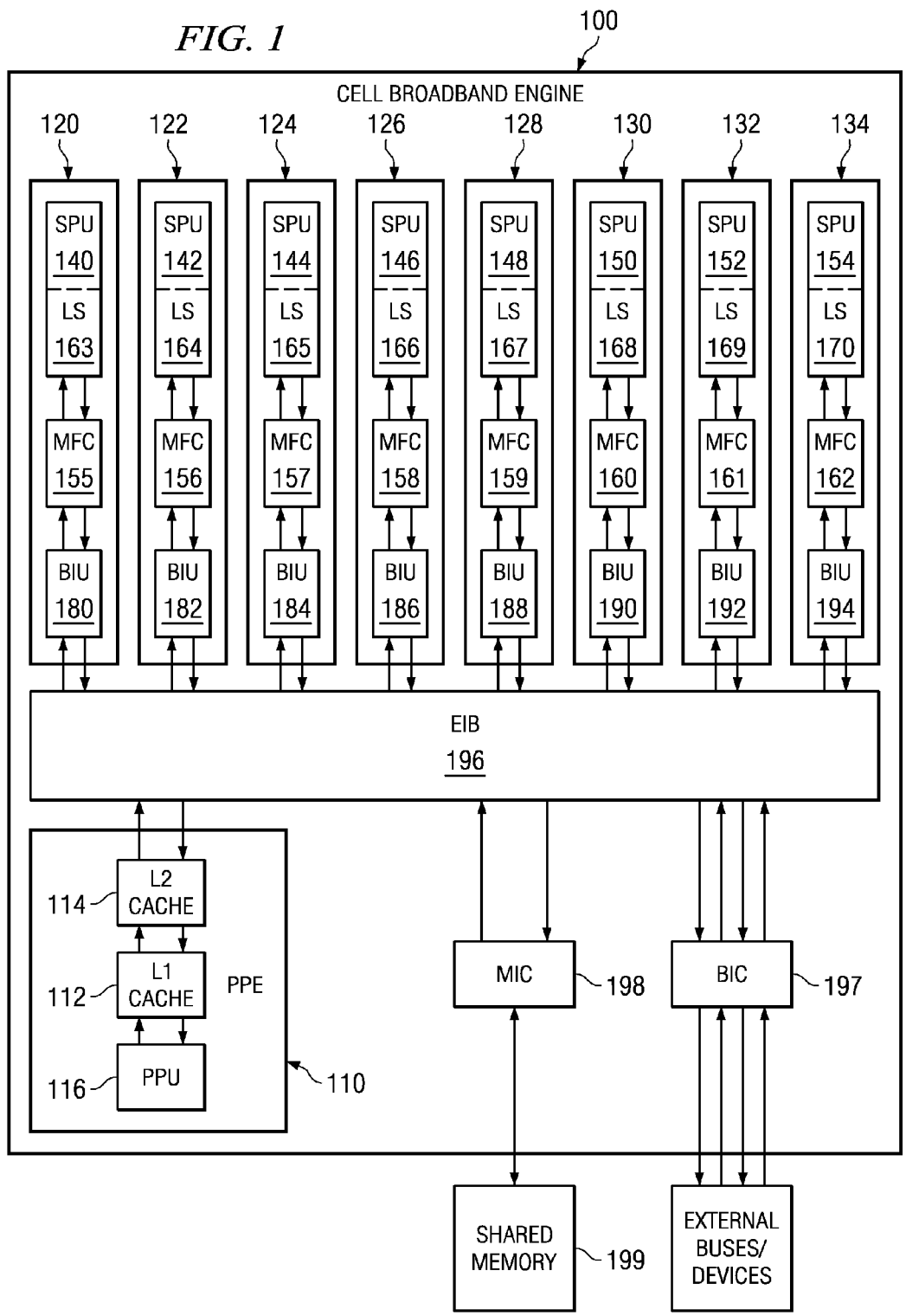
FIG. 1 is an exemplary block diagram of a data processing system in which exemplary aspects of the illustrative embodiments may be implemented.

Thus, the illustrative embodiments are especially well suited for use with a data processing environment or system in which a software cache is utilized. FIG. 1 is provided hereafter as an example of a data processing environment in which exemplary aspects of the illustrative embodiments may be implemented. It should be appreciated that FIG. 1 is only exemplary and is not intended to assert or imply any limitation with regard to the data processing environments in which aspects or embodiments may be implemented. Many modifications to the depicted data processing environment may be made without departing from the spirit and scope of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to the figures, FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

With the CBE 100, the SPEs implement a software cache using the local storages 163-170. As mentioned above, with known software cache mechanisms both software cache misses and software cache hits represent a large overhead and cost with regard to processor cycles used to handle these situations. Looking again at the example of the code sequence "=a[i]+a[i+4]+a[i+8]+a[i+16]," the transformed code in which software cache lookup instructions are inserted does not utilize the cache locality between the 4 accesses of a[i] to a[i+16]. Assuming a cache line of N=128 bytes, and assuming that a[i] is an array of 4 byte integer values, it is known that the 4 accesses of a[i] in the code sequence straddle, at most, 2 cache lines, i.e. the references in the code sequence do not span more than 256 bytes. This is an example of spatial locality with regard to the references in the code sequence. The illustrative embodiments use such spatial locality to reduce the number of cache lookup operation processor cycles. This spatial locality is used to improve the execution of both straight line code and loop code.

The illustrative embodiments use spatial locality to group references that have a high spatial locality into a stream of references. This can be several accesses to distinct elements of a given array or data structure in straight line code and/or in loop code. The references are grouped so that the addresses of the first and last references of the stream do not span more than one cache line worth of data. There may be multiple streams that are processed by the mechanisms of the illustrative embodiments, such as if the references span more than one cache line worth of data, a first portion of the references within a first cache line worth of data may be grouped into a first stream while a second portion of references within a second cache line worth of data may be grouped into a second stream of references.

Once grouped into streams of references, a cache lookup operation is performed for the first and last reference in a stream of references. The cache handles, i.e. the addresses of the cache lines in the local memory, e.g., the pointers "ptr" that point to the cache lines, are preserved for later use, such as by storing these addresses in defined registers. For other references in the stream, a simple computation, involving only 3 instructions and 6 processor cycles, to determine which of the two cache handles to use for that reference. For loops, the innermost loop is strip-mined so that the cache lookup is moved out of the innermost loop for maximum performance.

Figure 2A:
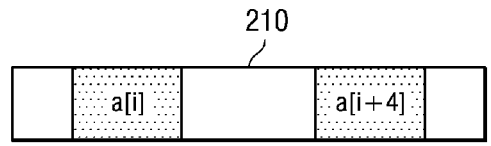
FIGS. 2A and 2B are exemplary diagrams illustrating the inability to know at compile time how data corresponding to memory references resides in a software cache.
Figure 2B:
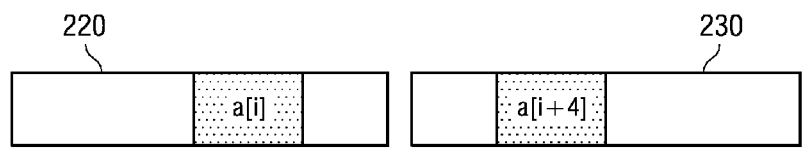

In general, when references are utilized in code statements, it cannot be known at compile time how the data corresponding to these references resides in software cache memory. FIGS. 2A and 2B illustrate this by way of an example in which there are two array accesses a[i] and a[i+4]. As shown in FIG. 2A, the data corresponding to these two array accesses a[i] and a[i+4] may be present relatively close to one another and thus, but on the same cache line 210. Alternatively, as shown in FIG. 2B, even though the array accesses may be relatively close to one another, the data for these accesses may be present on two cache lines 220 and 230.

Since the compiler is not able to determine whether, for particular references, the situation exists as shown in FIG. 2A or FIG. 2B, the code must determine the cache line for the reference for each access performed in code. For example, the getDataFromCache(addr) method described above may be executed for each reference or access performed in the code, as discussed above. The only exception to this is when the 2 cache lines are consecutive in memory. However, this generally cannot be guaranteed.

Assuming a software cache with a cache line of size N (in bytes) and a code where all of the references are naturally aligned, i.e. the data associated with references is aligned at multiples of a base size for the data type, the illustrative embodiments builds streams of references based on the references' locality. In order to build such streams of references, the illustrative embodiments aggregate references in such a way that a stream of references does not span more than N bytes, i.e. more than one cache line. This may be done, for example, by determining, for each reference r, if the address associated with that reference is within a range of base(S) and N−sizeof(r), where base(S) is the lowest address in the stream S and sizeof(r) is the size of the data accessed by the reference r. In other words, for each reference r in S, the following relationship exists base(S)<=address(r) and address(r)+sizeof(r)<N.

Once all references have been aggregated into streams in this manner, the illustrative embodiments generates two cache lookup operations for each stream and then uses one or the other of the cache handles generated by the cache lookup operations for each reference in the corresponding stream. Taking sequential code as an example, a first lookup operation is performed for the address corresponding to base(S), i.e. the lowest address present in the stream S, thereby yielding a cache handle cB. A second lookup operation is performed for the address corresponding to base(S)+N, i.e. the highest possible address in the stream S, thereby yielding a cache handle cN. Alternatively, rather than performing the second lookup operation for the highest possible address in stream S, the highest actual address present in the stream, i.e. top(S), may be used to thereby yield a cache handle cT.

Using the highest possible address base(S)+N is beneficial when performing such lookup operations for loop code since it will include the last iteration of the loop. This essentially allows for some implicit pre-fetching as well as executing fewer handle lookups. For example, using the highest possible address aids in pre-fetching in the following way. Since, in a loop, it is generally true that a large number of iterations are executed, performing a lookup for cB and cN guarantees that two distinct cache lines are "touched." In the event cN is not needed in this current iteration, it will be typically available for the next iteration. Namely, as the loop index "i" is increased, for example, to become a later iteration i' with i' larger than i, the "a[i'+u]" expression used to compute the base(S) handle will be pointing to the same cache line as the "a[i+u]+N expression used to compute the base(S)+N handle of the earlier iteration "i."

Using the highest actual address present in the stream is better for sequential, or scalar, i.e. non-loop, code since it avoids cache pollution and spurious misses. In this case, using base(S) and base (S)+N may be less efficient as it will require 2 cache lines to be brought into the software cache. It is less efficient because it may be the case that all references of the stream reside within a single cache line pointed to by cB, for example. As a result, is it generally preferable in such situations to get the handle for the first and last reference of the stream, respectively pointed to by references base(S) and top(S), as this will result, in general, in fewer cache lines being brought into the software cache.

Having performed two lookup operations for a stream S, and obtained the two cache handles cB and cN or cT, the illustrative embodiments determine for each reference in the stream S whether to use cB or cN/cT. The sequence base cache handle cB is used when the address of the reference, address(r), is less than a value X, where X is defined as (base(S)−(base(S) % N))+N), where base(S) % N is the base (S) modulo N. The value of X essentially identifies the beginning address of the next cache line in the software cache. Since it cannot be certain that base(S) is at the beginning of a cache line, the value of X, rather than simply adding N, must be used to determine the relative offset from the base(S) that identifies the beginning of the next cache line. Thus, if the address(r) is less than the value X, then the address(r) must be within the present software cache line. If the value of address (r) is greater than X, then the address(r) must be in the next software cache line. If the address(r) is greater than X, then either cN or cT, depending upon the implementation, is used for that reference rather than cB.

It should be appreciated that the value X may be computed with a relatively simple logic operation of "base(S) AND NOT (N−1)," given the fact that N is typically a power of 2. The "AND NOT (N−1)" essentially clears the n lower bits of the address of reference base(S), where N=2'. Thus, the computation for make the determination as to whether to use cB or cN/cT requires relatively few processor cycles. These processor cycles may further be eliminated if it is known at compile time what the relative alignment of base(S) and address(r) are, i.e. the computation of X need not be made.

Figure 3A:
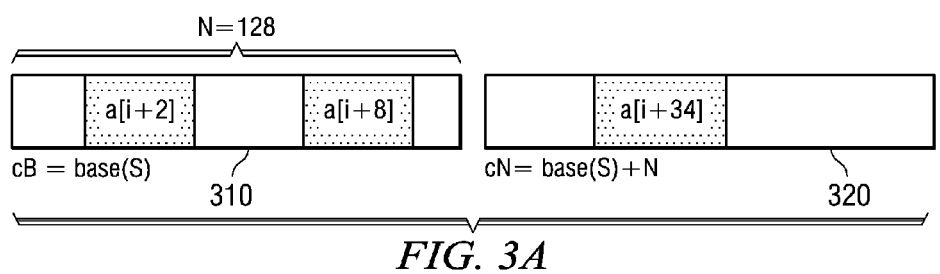
FIGS. 3A and 3B are exemplary diagrams illustrating a selection of a software cache line handle based on placement of data in software cache lines in accordance with one illustrative embodiment.
Figure 3B:
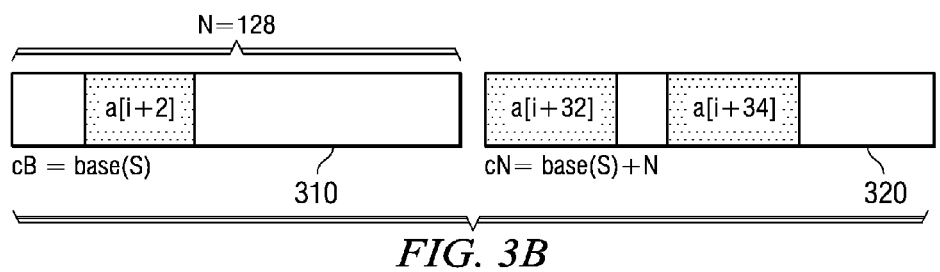

To illustrate the two possible outcomes depending upon the placement of data in the software cache lines, reference is made to FIGS. 3A and 3B. In FIG. 3A, an example is shown in which a plurality of accesses is made to an array a[i] with the accesses spanning two software cache lines 310 and 320. In FIG. 3A, the reference of interest, i.e. a[i+8] is present in the first of the two cache lines 310. FIG. 3B shows another example in which the plurality of accesses span the two cache lines 310 and 320, but the reference of interest a[i+32] is present in the second of the two cache lines 320. In both cases, the cache lines 310 and 320 have a size of N=128 bytes.

In FIG. 3A, when determining whether to use a handle cB for the first cache line 310 or the handle cN for the second cache line 320 for reference a[i+8], the above described relationship is evaluated. First, the value of X may be determined using the above operation, i.e. the value for (base(S)−base(S) % N)+N is determined using the logic relationship "base(S) AND NOT (N−1)." The evaluation is whether the address of a[i+8] is less than X, i.e. address(a[i+8])<(base(S)−base(S) % N)+N or base(S) % N<base(S)−address(a[i+8])+N. If this inequality holds true, then it is known that the cB handle should be used. If, however, the inequality does not hold true, then it is known that the cT/cN handle should be used instead. The "&" operator extracts the address out of a reference. For example, the address of reference a[0] is obtained by &a[0]. In other words, a[0] delivers the value of array a at location 0, and &a[0] delivers the address in memory where the value of array a at location zero resides. Assuming that i=0 and &a[0] %128=0. one gets:

&a[2]%128<&a[2]−&a[8]+128

((&a[0]+2)*4)%128<(&a[0]+2)*4−(&a[0]−8)*4+128

8<102 is true, thus use cB

Thus, in this case, the evaluation shows that cB should be used for resolving the reference a[i+8] since a[i+8] is within the same cache line as the base reference in the stream.

With reference to FIG. 3B, assuming again that i=0 and &a[0]%128=0, one gets, for the reference of interest a[i+32]:

&a[2]%128<&a[2]−&a[32]+128

((&a[0]+2)*4)% 128<(&a[0]+2)*4−(&a[0]−32)*4+128

8<8 is not true, thus use cN/cT

Thus, in this case, the evaluation shows that cN or cT, depending on the implementation, should be used for resolving the reference a[i+32] since a[i+32] is not within the same cache line as the base reference in the stream.

Using the above approach to resolving references while taking into account locality of the references, a compiler utilizing this approach may using the following code sequence prior to the code sequence in which the references a[i] are present:

```
if (miss (a[i])) missHandler(a[i]);
cB = lineInCache(a[i]);
if (miss(a[i+N])) missHandler(a[i+N]);
cN = lineInCache(a[i+N]);
X = (N − &a[i]%N)/4    //term modified to be normalized to index
computations
``` where N is the cache line size in bytes, and where the expression is divided by the size of the data type, e.g., 4 bytes for integer values, 8 bytes for floating point values, etc. The above X computation can be understood as follows. Let Y be "&a[i]% N", namely where Y is the first byte in the line that is being useful. "N−Y" corresponds to the number of useful bytes in this cache line, from the first useful value to the end of the cache line. It is assumed here, without loss of generality, that loops iterate in increasing values of loop index. Dividing (N−Y) by the byte size of data indicates the number of loop iterations in which useful data will be found within that cache line. X is defined as the quantity X=(N−Y)/dataSize, where dataSize=4 in the above example, but is not limited to being 4 and is dependent upon the data type. Note here that if the loop iterates in decreasing values of the loop index, the loop can be trivially transformed using a loop normalization phase. The above approach can also be extended to cases where computation of the array index includes an occurrence of the loop index with a negative sign (e.g. a[V−i]). In such a case, the computations may be reversed, i.e. compute the number of useful data in the cache line pointed to by the handle cT and then, when the useful data in the cache line pointed to by cT runs out, switch back to the handle pointed to by cB.

With this code sequence before the code sequence having the actual references to the array a[i], the following code may be used for each given reference r[i+k] where 0<=k<n and where n is the cache line size in bytes N, divided by the size of the data type in bytes:

data=load(k<X?cB cN,offset(&a[i+k]));

where cB is used for k=0 and cN is used for k=n. It should be noted that it is assumed here that the load operations take 2 parameters, a first base address and a second offset that is added to the base address in order to get the address of the data to be loaded. It should further be noted that it is also assumed here that "cond ? res1: res2" is a conditional expression, where the final result is dependent on the condition "cond." When "cond" evaluates to true, result "res1" is the result of the conditional expression, and when "cond" evaluates to false, then the result "res2" is the result of the conditional expression.

In essence, by utilizing the approach of the illustrative embodiments to resolving references based on locality, the illustrative embodiments trade off the code "if (miss(&a[i+k])) missHandler(&a[i+k]); cl=lineInCache(&a[i+k]);" which, in a SPU of a the CBE 100 in FIG. 1, takes approximately 11 instructions and 27+ processing cycles for evaluating the software cache hit, with the code "k<X ? cB: cN" which only takes the SPU 2 instructions, a compare and a select, and 4 processing cycles to evaluate.

FIG. 4A illustrates transformed code of an original code statement by a compiler using a traditional approach. FIG. 4B illustrates transformed code of the same original code statement by a compiler using a locality approach in accordance with one illustrative embodiment. As shown in FIG. 4A, each reference must be individually resolved with regard to a cache miss handler. The evaluation for determining whether there is a cache hit or miss requires 11 instructions and 27 processor cycles to perform the evaluation as previously noted above and if there is a cache hit, it may require 50 or more instructions and 400 or more processing cycles to resolve when the cache misses.

As shown in FIG. 4B, rather than having to resolve each reference with regard to the cache miss handler, a cache miss determination is made first with regard to the lowest address in the reference stream and the highest address in the reference stream in order to ensure that the proper cache lines are present in the software cache. Thereafter, the data may be loaded based on a calculation of the address of the data relative to one of the base cache handle cB of a first cache line or a cache handle of a next cache line cN/cT.

Thus, as shown in FIG. 4B, with the illustrative embodiments, the 4 references a[i], a[i+4], a[i+8], and a[i+16] are grouped into one or more streams and a software cache lookup operation is performed for the first and last reference, e.g., a[i] and a[i+16] assuming a single stream in this example, in each stream. A dynamic test is then used for the two remaining references a[i+4] and a[i+8]. Assuming the same overhead as in the known compiler mechanisms, the overhead due to the software cache may be reduced by the mechanisms of the illustrative embodiments from 4*27=108 processor cycles (in FIG. 4A) to 2*27+6+2*4=68 processor cycles (in FIG. 4B), assuming no execution overlap. That is, there are 27 processor cycles for each cache lookup operation, 6 processor cycles for the evaluation of the value X, and 4 processor cycles for each of the load operations with the conditional expression within their base address field (a total of 2 in this example). It should be noted that the more references in the stream, the better the overhead reduction and increased speed of resolving the references as the additional cost for each reference in a stream is only 4 extra processor cycles compared to the extra 27 processor cycles in a traditional compiler approach. In terms of code density, the mechanisms of the illustrative embodiments provide only an additional cost of 2 extra instructions per reference as opposed to the 11 extra instructions present in traditional compiler approaches.

The compiler code optimizations described above may be applied to loop code as well as sequential code. For loop code, however, there are additional optimizations that may be performed with regard to the mechanisms of the illustrative embodiments. With regard to loop code, the key insight of the illustrative embodiments is that streams spanning at most one cache line having a size of N bytes, e.g., N=128 bytes in the above examples, are to be formed. Assuming computation on 4 byte integers, for example, this means that the innermost references to a[i] need to be grouped in a sequence of at most 32 iterations, i.e. 4*32=128 bytes. This is done by first strip-mining the loop.

FIG. 5A is an exemplary diagram of loop code illustrating original loop code and the transformed loop code according to a known compiler technique. FIG. 5B illustrates a strip mined version of the original loop code of FIG. 5A assuming 4 byte accesses and a cache line of 128 bytes. As can be seen, the original loop is transformed into two loops, an inner loop 510 and an outer loop 520. The inner loop 510 performs a loop for i=0 to 32 while the outer loop 520 iterates over the original loop range ii=0 to 1K in steps of 32. Thus, the inner loop 510 spans a single cache line of 128 bytes (4*32) and the outer loop 520 spans the entire range of the original loop on a cache line by cache line basis (i.e. 128 byte iterations). That is, all of the references a[i+ii] accumulated over the entire "for(i=0; i<32; i++)" innermost loop 510 can be grouped into a single stream.

FIG. 5C is an exemplary diagram illustrating the locality optimization performed by the illustrative embodiments following the strip mining illustrated in FIG. 5B. By applying the transformation proposed for sequential code, or straight-line code, the code as shown in FIG. 5C is obtained in which all of the software cache lookup operations are performed before the corresponding loops 510 and 520. In the depicted example, the cache lookup code "if (miss(&a[i]) missHandler (&a[i]); cB=lineInCache(&a[i]);" and "if (miss(&a[i+32] missHandler(&a[i+32]); cN=lineInCache(&a[i+32]);" is prior to the inner loop 510. In addition, the code for calculating the value of X is prior to the inner loop as well.

Figures 5D, 7:
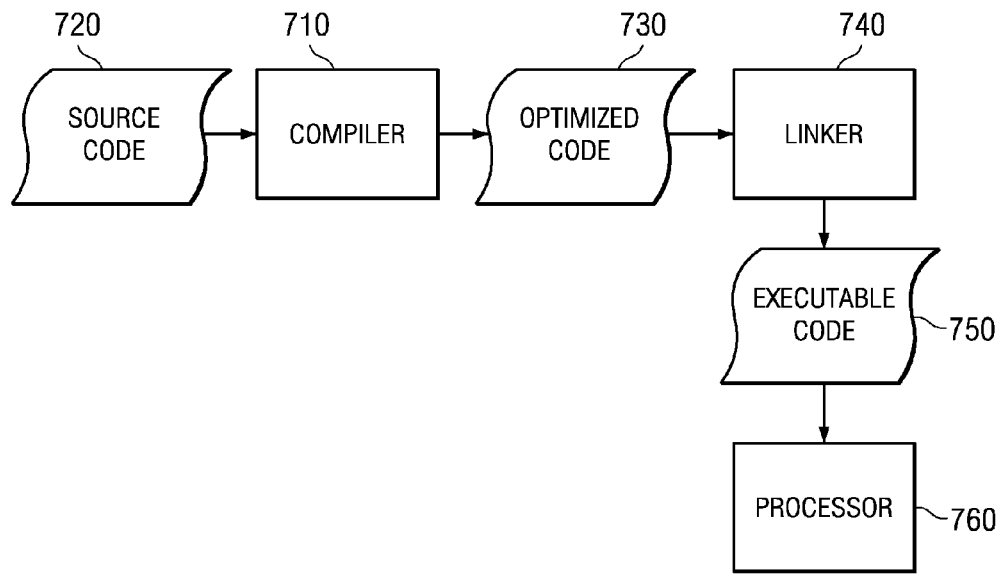
FIG. 5D is an exemplary diagram illustrating an greater level of optimization of the code in FIG. 5C in accordance with one illustrative embodiment.
FIG. 7 is an exemplary block diagram of a compiler in accordance with one illustrative embodiment.

It can be seen in FIG. 5C that there is some implicit redundancy in FIG. 5C as the miss handler call for a[i+32] is the same as the miss handler call for a[i] in the next outermost iteration. This will happen whenever the strip mined loop has an iteration block that is a factor of the cache line size divided by the element size, e.g., 128/4=32. Thus, in such a situation, a further reduction in the number of lookup operations, by a factor of 2, may be obtained by further transforming the optimized code in FIG. 5C into the form shown in FIG. 5D. In this transformed code, the cache lookup operation for the beginning of the first cache line is moved outside of the outermost loop 520 and an additional statement "cB=cN" is added after the innermost loop 510 which resets the base address of the next cache line to the value for cN, i.e. cN of the previous cache line is the same as cB for the next cache line. In this way, the handle for the next cache line is remembered from the cache lookup operation for the previous cache line.

Using the above example, with the optimized code above, 1K/32=32 lookup operations are performed instead of the original 1028 lookup operations in the code of FIG. 5A. This corresponds to an overhead of 32*27+1024*4=4,960 processor cycles compared to the original 27,648 processor cycles in the code of FIG. 5A. This is a reduction of more than a factor of 5.

Figure 6A:
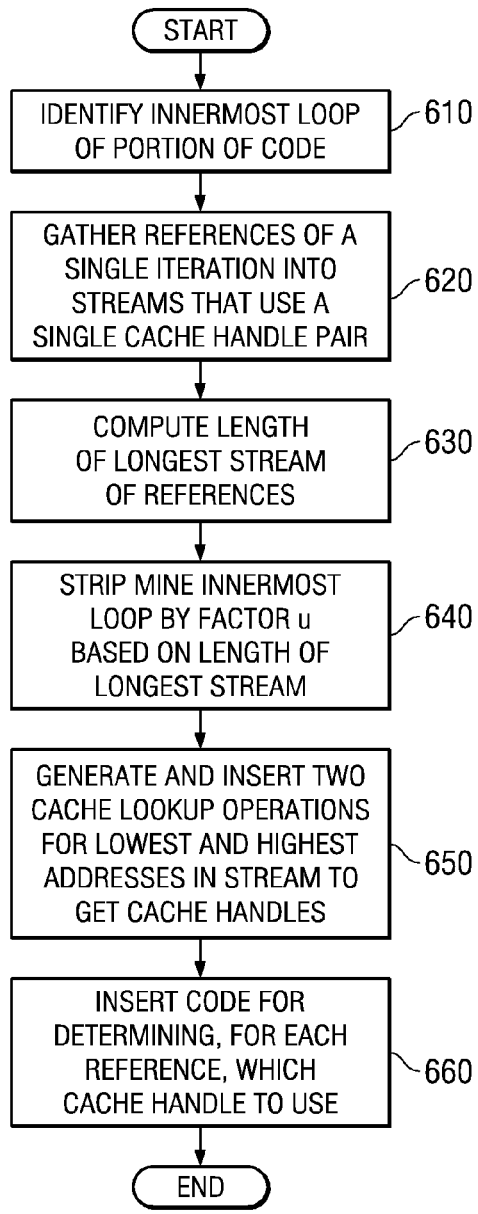
FIG. 6A is a flowchart outlining an operation for optimizing cache lookup code for memory references in a loop in accordance with one illustrative embodiment.

FIG. 6A is a flowchart outlining an operation for optimizing cache lookup code for memory references in accordance with one illustrative embodiment. As shown in FIG. 6A, the operation starts by, for a next portion of code, identifying an innermost loop of the portion of code (step 610). For the innermost loop, references of a single iteration are gathered into streams that use as single handle pair, i.e. each set of references span at most one cache line (step 620). The length (l in elements of s byte size) of the longest stream of references is computed (step 630). The innermost loop is then strip mined by a factor of u such that (u+1)s<=N (N is the length in bytes of the cache line)(step 640). Thereafter, for each stream, two lookup operations, for the lowest address in the stream and the highest address in the stream, or the address at N, are generated and placed appropriately with relation to the loop code (step 650). Code is inserted into the loop for determining, for each reference, whether to use the cache line handle for the lowest address in the stream or the highest address in the stream (step 660). The above operation may be repeated for additional portions of code being optimized by the compiler and for additional loops in a nested manner.

Figure 6B:
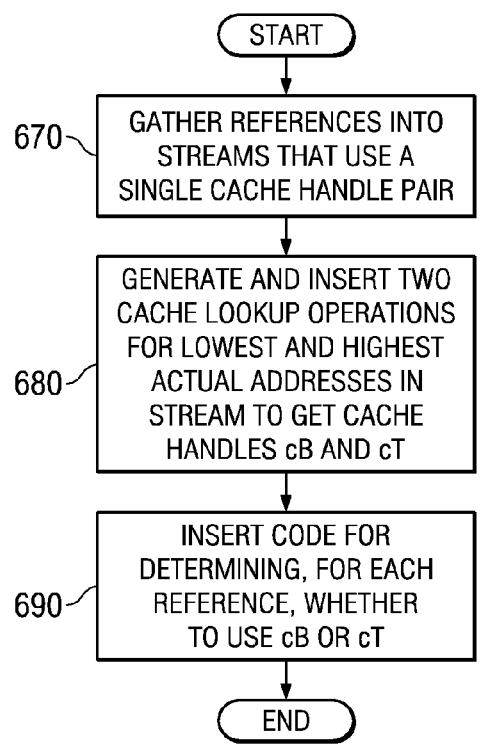
FIG. 6B is a flowchart outlining an operation for optimizing cache lookup code for scalar, i.e. non-loop, code in accordance with one illustrative embodiment.

FIG. 6B is a flowchart outlining an operation for optimizing cache lookup code for scalar, i.e. non-loop, code in accordance with one illustrative embodiment. FIG. 6B is similar to FIG. 6A with regard to steps 620, 650 and 660. As shown in FIG. 6B, the operation starts with gathering references in the source code into streams that use as single handle pair, i.e. each set of references span at most one cache line (step 670). Thereafter, for each stream, two cache lookup operations, one for the lowest reference address, base(S), of the stream and one for highest actual reference address, top(S), of the stream, are generated and inserted into the source code (step 680). As a result, the two handles cB and cT are obtained for each stream. Code is inserted into the source code for determining, for each reference, whether to use cB or cT of the corresponding stream (step 690). The operation then terminates, but may be repeated for other portions of the source code.

It should be appreciated that the operations shown in FIGS. 6A and 6B may be used individually or together to optimize portions of source code based on whether the portions include loops or non-loop code. Thus, for example, for one portion of source code, if that portion of source code involves a loop, the operation outlined in FIG. 6A may be followed while for another portion of source code that does not involve a loop may utilize the operation outlined in FIG. 6B. The compiler may dynamically determine which operation to use based on an analysis of the structure of the source code. The result is optimized code that is output for use in generating executable code.

FIG. 7 is an exemplary block diagram of a compiler in accordance with one illustrative embodiment. As shown in FIG. 7, the compiler 710 receives original source code 720 which is analyzed in accordance with the illustrative embodiments for which the compiler 710 is configured. That is, the compiler 710 identifies portions of the source code 720 that meet the source code patterns corresponding to code that may have the cache lookup operations of the memory accesses optimized through the transformations of the illustrative embodiments.

The compiler then transforms the source code 720 to utilize optimized cache lookup code of the illustrative embodiments. This may involve strip mining loops, grouping references into streams, inserting code for performing software cache lookup operations for the first and last references in the streams in order to obtain cache handles for cache lines spanned by the stream, and code for reusing these cache handles when performing operations with regard to references within the streams. The result is optimized code 730 that implements the optimizations of the illustrative embodiments. The optimized code 730 is then provided to linker 740 that performs linker operations, as are generally known in the art, to thereby generate executable code 750. The executable code 750 may then be executed by the processor 760, which may be a processor in the CBE 100 of FIG. 1, for example, or another data processing system architecture.

Thus, the illustrative embodiments provide mechanisms for optimizing the cache lookup operations of references in original code. The mechanisms of the illustrative embodiments utilize the locality of references by grouping the references into streams that span at most one cache line in size. Cache handle lookup operations are performed for determining whether the data for references are present in the same cache line or different cache lines. As a result, a lower overhead optimized code is generated that requires a significantly lower amount of processor cycles to complete.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system having a software cache, for optimizing memory accesses in source code, comprising:

grouping memory references in the source code into a reference stream, the reference stream having a size equal to or less than a size of a software cache line;

transforming the source code into optimized code at least by:

inserting cache lookup code for performing a cache lookup of a lowest memory reference address in the reference stream to thereby generate a first cache line handle;

inserting cache lookup code for performing a cache lookup of one of an actual highest memory reference address in the reference stream or a highest possible memory reference address in the reference stream, to thereby generate a second cache line handle; and for each other memory reference in the reference stream, inserting code for determining whether to use the first cache line handle or second cache line handle as a basis for retrieving data from the software cache corresponding to the memory reference; and outputting the optimized code for generation of executable code for execution on one or more processors.

2. The method of claim 1, wherein the actual highest memory reference address in the reference stream is used to generate the second cache handle if the source code is a sequential portion of code that does not contain a loop.

3. The method of claim 1, wherein the highest possible memory reference address in the reference stream is used to generate the second cache line handle if the source code contains a loop.

4. The method of claim 1, wherein the code for determining whether to use the first cache line handle or the second cache line handle includes code for calculating an offset to a beginning address of a next cache line relative to a cache line to which the first cache line handle points.

5. The method of claim 4, wherein the code for determining whether to use the first cache line handle or the second cache line handle includes:
   code for determining if an address of a corresponding memory reference in the reference stream is less than the offset to the beginning address of the next cache line;
   code for using the first cache line handle if the address of the corresponding memory reference in the reference stream is less than the offset to the beginning address of the next cache line; and
   code for using the second cache line handle if the address of the corresponding memory reference in the reference stream is not less than the offset to the beginning address of the next cache line.

6. The method of claim 1, wherein grouping memory references in the source code into a reference stream comprises:
   identifying an innermost loop within the source code;
   gathering memory references of a single iteration of the innermost loop into streams; and
   strip mining the innermost loop based on lengths of the streams.

7. The method of claim 6, wherein strip mining the innermost loop based on lengths of the streams comprises computing a length l of the longest stream and using a factor of u to strip mine the innermost loop such that $(u+l)s<=N$, where s is an element size and N is the length of a cache line.

8. The method of claim 1, wherein the method is implemented by a compiler.

9. The method of claim 1, wherein the executable code is executed by one or more processors of the data processing system.

10. A computer program product comprising a non-transitory computer recordable medium having a computer readable program recorded thereon, wherein the computer readable program, when executed on a computing device, causes the computing device to:
   group memory references in source code into a reference stream, the reference stream having a size equal to or less than a size of a Software cache line;
   transform the source code into optimized code at least by:
      inserting cache lookup code for performing a cache lookup of a lowest memory, reference address in the reference stream to thereby generate a first cache line handle;
      inserting cache lookup code for performing a cache lookup of one of an actual highest memory reference address in the reference stream or a highest possible memory reference address in the reference stream, to thereby generate a second cache line handle; and
      for each other memory reference in the reference stream, inserting code for determining whether to use the first cache line handle or the second cache line handle as a basis for retrieving data from the software cache corresponding to the memory reference; and
   output the optimized code for generation of executable code for execution on one or more processors.

11. The computer program product of claim 10, wherein the actual highest memory reference address in the reference stream is used to generate the second cache line handle if the source code is a sequential portion of code that does not contain a loop.

12. The computer program product of claim 10, wherein the highest possible memory reference address in the reference stream is used to generate the second cache line handle if the source code contains a loop.

13. The computer program product of claim 10, wherein the code for determining whether to use the first cache line handle or the second cache line handle includes code for calculating an offset to a beginning address of a next cache line relative to a cache line to which the first cache line handle points.

14. The computer program product of claim 13, wherein the code for determining whether to use the first cache line handle or the second cache line handle includes:
   code for determining if an address of a corresponding memory reference in the reference stream is less than the offset to the beginning address of the next cache line;
   code for using the first cache line handle if the address of the corresponding memory reference in the reference stream is less than the offset to the beginning address of the next cache line; and
   code for using the second cache line handle if the address of the corresponding memory reference in the reference stream is not less than the offset to the beginning address of the next cache line.

15. The computer program product of claim 10, wherein the computer readable program further causes the computing device to group memory references in the source code into a reference stream by:
   identifying an innermost loop within the source code;
   gathering memory references of a single iteration of the innermost loop into streams; and
   strip mining the innermost loop based on lengths of the streams.

16. The computer program product of claim 15, wherein the computer readable program further causes the computing device to strip mine the innermost loop based on lengths of the streams by computing a length l of the longest stream and using a factor of u to strip mine the innermost loop such that $(u+l)s<=N$, where s is an element size and N is the length of a cache line.

17. An apparatus, comprising:
   a processor; and
   a memory coupled to the processor, wherein the memory comprises instructions which, when executed by the processor, cause the processor to:
   group memory references in source code into a reference stream, the reference stream having a size equal to or less than a size of a software cache line;
   transform the source code into optimized code at least by:
      inserting cache lookup code for performing a cache lookup of a lowest memory reference address in the reference stream to thereby generate a first cache line handle;
      inserting cache lookup code for performing a cache lookup of one of an actual highest memory reference address in the reference stream or a highest possible memory reference address in the reference stream, to thereby generate a second cache line handle; and
      for each other memory reference in the reference stream, inserting code for determining whether to use the first cache line handle or the second cache line handle as a basis for retrieving data from the software cache corresponding to the memory reference; and
   output the optimized code for generation of executable code for execution on one or more processors.

18. The apparatus of claim 17, wherein the actual highest memory reference address in the reference stream is used to generate the second cache line handle if the source code is a sequential portion of code that does not contain a loop.

19. The apparatus of claim 17, wherein the highest possible memory reference address in the reference stream is used to generate the second cache line handle if the source code contains a loop.

20. The apparatus of claim 17, wherein the code for determining whether to use the first cache line handle or the second cache line handle includes code for calculating an offset to a beginning address of a next cache line relative to a cache line to which the first cache line handle points.

21. The apparatus of claim 20, wherein the code for determining whether to use the first cache line handle or the second cache line handle includes:
   code for determining if an address of a corresponding memory reference in the reference stream is less than the offset to the beginning address of the next cache line;
   code for using the first cache line handle if the address of the corresponding memory reference in the reference stream is less than the offset to the beginning address of the next cache line; and
   code for using the second cache line handle if the address of the corresponding memory reference in the reference stream is not less than the offset to the beginning address of the next cache line.

22. The apparatus of claim 17, wherein the instructions further cause the processor to group memory references in the source code into a reference stream by:
   identifying an innermost loop within the source code;
   gathering memory references of a single iteration of the innermost loop into streams; and
   strip mining the innermost loop based on lengths of the streams.

* * * * *